(12) United States Patent
Palmer et al.

(10) Patent No.: US 9,360,059 B2
(45) Date of Patent: Jun. 7, 2016

(54) TWIN RATIO DIFFERENTIAL WITH BI-DIRECTIONAL OVERRUNNING CLUTCH

(71) Applicant: The Hilliard Corporation, Elmira, NY (US)

(72) Inventors: James E. Palmer, Elmira Heights, NY (US); John R. Updyke, Horseheads, NY (US)

(73) Assignee: The Hilliard Corporation, Elmira, NY (US)

(*) Notice: Subject to any disclaimer, the term of this patent is extended or adjusted under 35 U.S.C. 154(b) by 0 days.

(21) Appl. No.: 14/525,889

(22) Filed: Oct. 28, 2014

(65) Prior Publication Data

US 2015/0159743 A1 Jun. 11, 2015

Related U.S. Application Data

(60) Provisional application No. 61/912,173, filed on Dec. 5, 2013.

(51) Int. Cl.

| | |
|---|---|
| *F16H 48/12* | (2012.01) |
| *F16D 41/08* | (2006.01) |
| *B60K 17/34* | (2006.01) |
| *B60K 23/08* | (2006.01) |
| *B60K 17/02* | (2006.01) |
| *B60K 17/16* | (2006.01) |

(52) U.S. Cl.
CPC .............. *F16D 41/088* (2013.01); *B60K 17/34* (2013.01); *B60K 17/02* (2013.01); *B60K 17/16* (2013.01); *B60K 23/08* (2013.01); *Y10T 74/19005* (2015.01)

(58) Field of Classification Search
CPC ..... F16H 48/08; F16H 2048/085; F16H 1/14; F16H 1/222
USPC ................................................ 74/650, 665 F
See application file for complete search history.

(56) References Cited

U.S. PATENT DOCUMENTS

| | | | | |
|---|---|---|---|---|
| 5,913,938 | A * | 6/1999 | Brooks | B60K 17/04 74/417 |
| 6,053,073 | A * | 4/2000 | Tyson | F16H 48/142 192/200 |
| 6,510,911 | B1 * | 1/2003 | Satou | B60K 17/16 180/65.235 |
| RE38,012 | E | 3/2003 | Ochab et al. | |
| 6,622,837 | B2 | 9/2003 | Ochab et al. | |
| 6,629,590 | B2 | 10/2003 | Ochab et al. | |
| 6,722,484 | B2 | 4/2004 | Ochab et al. | |
| 8,840,514 | B1 | 9/2014 | Knickerbocker et al. | |

* cited by examiner

*Primary Examiner* — Ha D Ho
(74) *Attorney, Agent, or Firm* — Drinker Biddle & Reath LLP

(57) ABSTRACT

A front differential for a four wheel drive vehicle including a pinion assembly with first and second pinions that are engaged with a ring gear assembly with first and second ring gears. The first pinion and first ring gear combination are rotatable independent from the second pinion and second ring gear combination, thus permitting one to rotate relative to the other. The first pinion and first ring gear combination are adapted to rotate one driven shaft, and the second pinion and second ring gear combination are adapted to rotate the other driven shaft. A bi-directional overrunning clutch assembly is engaged with an end of the drive shaft and includes one set of rolls located adjacent to the first pinion shaft, and another set of rolls located adjacent to the second pinion shaft. The clutch assembly control torque transmission between the pinion shafts and the drive shaft.

27 Claims, 13 Drawing Sheets

TWIN RATIO DIFFERENTIAL WITH BI-DIRECTIONAL OVERRUNNING CLUTCH

RELATE APPLICATION

This application is related to and claims priority from U.S. Provisional Application 61/912,173, filed on Dec. 5, 2013, the disclosure of which is incorporated herein by reference in its entirety.

FIELD OF THE INVENTION

The present invention is directed to differentials and, more particularly, an improved differential drive for a front drive assembly that incorporates a bi-directional overrunning clutch for controlled engagement of the front drive axles.

BACKGROUND OF THE INVENTION

The increased demand in recent years for off-road and all terrain vehicles has led to tremendous developments in those types of vehicles. Many of the developments have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four wheel drive. These systems, however, require the vehicle to be in either 2-wheel or 4-wheel drive at all times.

Generally, all four-wheel drive vehicles include a differential for transferring torque from a drive shaft to the driven shafts that are attached to the Wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner). There are four main types of conventional differentials: open, limited slip, locking, and center differentials. An open differential allows differential action between the half shafts but, when one wheel loses traction, all available torque is transferred to the wheel without traction resulting in the vehicle stopping.

A limited slip differential overcomes the problems with the open differential by transferring all torque to the wheel that is not slipping. Some of the more expensive limited slip differentials use sensors and hydraulic pressure to actuate the clutch packs locking the two half shafts together. The benefits of these hydraulic for viscous) units are often overshadowed by their cost, since they require expensive fluids and complex pumping systems. The heat generated in these systems, especially when used for prolonged periods of time may also require the addition of an auxiliary fluid cooling source.

The third type of differential is a locking differential that uses clutches to lock the two half shafts together or incorporates a mechanical link connecting the two shafts. In these types of differentials, both wheels can transmit torque regardless of traction. The primary drawback to these types of differentials is that the two half shafts are no longer independent of each other. As such, the half shafts are either locked or unlocked to one another. This can result in problems during turning where the outside wheel tries to rotate faster than the inside wheel. Since the half shafts are locked together, one wheel must scrub. Another problem that occurs in locking differentials is twitchiness when cornering due to the inability of the two shafts to turn at different speeds.

The final type of differential is a center differential. These types of differentials are used in the transfer case of a four wheel drive vehicle to develop a torque split between the front and rear drive shafts.

Many differentials on the market today use some form of an overrunning clutch to transmit torque when needed to a driven shaft. One successful use of an overrunning clutch in an all terrain vehicle is disclosed in U.S. Pat. No. RE38,012, commonly owned by the assignee of the present invention, describes a bi-directional overrunning clutch for controlling torque transmission between a secondary drive shaft and secondary driven shafts. This transmission system is beneficial in four wheel drive vehicles where it is desirable to be able to engage and disengage the secondary driven shafts in different driving environments. The system described in U.S. Pat. No. RE38,012 includes an innovative system to advance and/or retard a roll cage, thereby controlling the ability of the differential to engage and disengage depending on the operational state of the primary and secondary wheels. The system includes an electromechanical device, which in one embodiment is an electrically controlled coil adjacent to an armature plate that is engaged with the roll cage and rotates in conjunction with the roll cage. When the coil is energized, an electromagnetic field is produced which hinders the rotation of the armature plate, thus causing the roll cage to drag or advance into an appropriate position relative a clutch housing.

The differential in U.S. Pat. No. RE38,012 also includes a backdrive system that actively engages the secondary shafts in certain situations where extra traction is needed. For example, when the vehicle is driving down a slope and the differential is used in the front differential, the system engages the front wheels, which are the wheels with the better traction.

U.S. Pat. No. 6,622,837, commonly assigned to the assignee of the present invention, describes a differential system that includes a bi-directional overrunning clutch with automatic backdrive capability. In this system, an electromagnetic device is used to engage an armature plate that is keyed into the roll cage through tangs. Energizing of the electromagnetic device attracts the armature plate causing it to drag the roll cage, thereby placing the clutch in the activated position for four wheel drive. In another embodiment, a hydraulic piston engages the roll cage causing it to drag.

U.S. Pat. No. 6,722,484 discloses another bi-directional overrunning clutch that is useful on the primary drive axle for providing continuous engagement with overrunning capability, while at the same time providing engine braking capability. The overrunning clutch includes at least one friction member which is in contact with the roll cage and the hub such that, during operation, the friction member generates friction forces between the roll cage and the hub which cause the roll cage to turn with the hub, thus placing the roll cage in the forward-engagement position.

In the systems described above, the overrunning clutch was incorporated into the differential between the ring gear and the two secondary driven shafts so as to independently control engagement and disengagement of those driven shafts by directly engaging/disengaging the hubs of the secondary driven shafts. The location of the clutch at the driven shaft in the prior systems means that the clutch components have to be designed heavier in order to withstand high torque. As engines, transmissions, and vehicles evolve; the amount of torque required to be driven by a differential is increasing. In turn, this causes current overrunning clutches to get bigger, taking up space that may not be available. A need still exists for an improved differential system that can transmit higher torque in a smaller package.

SUMMARY OF THE INVENTION

A front differential for a four wheel drive vehicle is disclosed. The front differential includes a differential housing with a pinion assembly mounted inside. The pinion assembly includes a first pinion with a pinion shaft and a pinion gear on an end, and a second pinion with a pinion shaft and a pinion gear on an end. The second pinion is mounted concentrically within the first pinion and is configured to be rotatable independent from the first pinion. A ring gear assembly is engaged with the pinion assembly for transferring rotary motion between a driveshaft and the driven shafts. The ring gear assembly includes a first ring gear with gear teeth, a hub and a stub shaft, and a second ring gear with gear teeth, a hub and recess. The stub shaft of the first ring gear being disposed within the recess of the second ring gear so as to arrange the first and second ring gears concentric with each other and rotatable about the same axis. Each hub includes a set of splines which are configured to engage with mating splines on one of the driven shafts for transmitting rotation between the hubs and the driven shafts. The first and second ring gears are mounted so as to be independently rotatable within the differential housing.

The first pinion gear is engaged with the first gear teeth so that rotation of the first pinion produces corresponding rotation of the first ring gear. The second pinion gear is engaged with the second gear teeth so that rotation of the second pinion produces corresponding rotation of the second ring gear. The first pinion and first ring gear combination are mounted so as to be rotatable independent from the second pinion and second ring gear combination, thus permitting one to rotate relative to the other. The first pinion and first ring gear combination are adapted to rotate one driven shaft, and the second pinion and second ring gear combination are adapted to rotate the other driven shaft.

The differential housing includes a bi-directional overrunning clutch assembly with a clutch housing located within the differential housing and mounted so as to be rotatable inside the differential housing. The clutch housing includes a portion which is configured to engage with an end of a drive shaft for transmitting rotary motion between the drive shaft and the housing. The clutch housing has a contoured internal surface defining cam surfaces. A roll cage assembly is located within the clutch housing and includes a roll cage with two sets of rolls. Each roll is located within a slot formed in the roll cage. The rolls are spaced around the circumference of the cage. A plurality of springs are mounted to the roll cage for positioning the rolls in the slots. One set of rolls is located between a portion of the contoured surface of the clutch housing and a portion of the first pinion shaft. The other set of rolls is located between a portion of the contoured surface of the clutch housing and a portion of the second pinion shaft.

An electromagnetic control system is provided for indexing the roll cage relative to the clutch housing. The electromagnetic control system includes an indexing device for indexing the roll cage, and an electronic control system connected to the indexing device which, when activated, is adapted to cause the indexing device to index the roll cage relative to the clutch housing.

A spring assembly is mounted in the differential housing and configured to bias the roll cage to a neutral position where the roll cage is not indexed.

In one embodiment, the second pinion shaft includes a pinion hub on the second pinion shaft that rotates in combination with the second pinion shaft. The pinion hub is located between the set of rolls and an outer surface of the second pinion shaft. The shaft of the second pinion preferably extends axially out from an end of the first pinion shaft. The pinion hub is located about the second pinion shaft and axially adjacent to the end of the first pinion shaft.

The differential housing preferably includes a cup-shaped portion with a bearing seat formed about an axial opening. A retention flange extends axially away from the seat. A bearing is mounted on the seat against the flange. Preferably the first and second pinion gears are located on one side of the bearing, and the first and second pinion shafts extend through to an opposite side of the bearing.

It is to be understood that both the foregoing general description and the following detailed description are exemplary and explanatory and are intended to provide further explanation of the invention as claimed.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
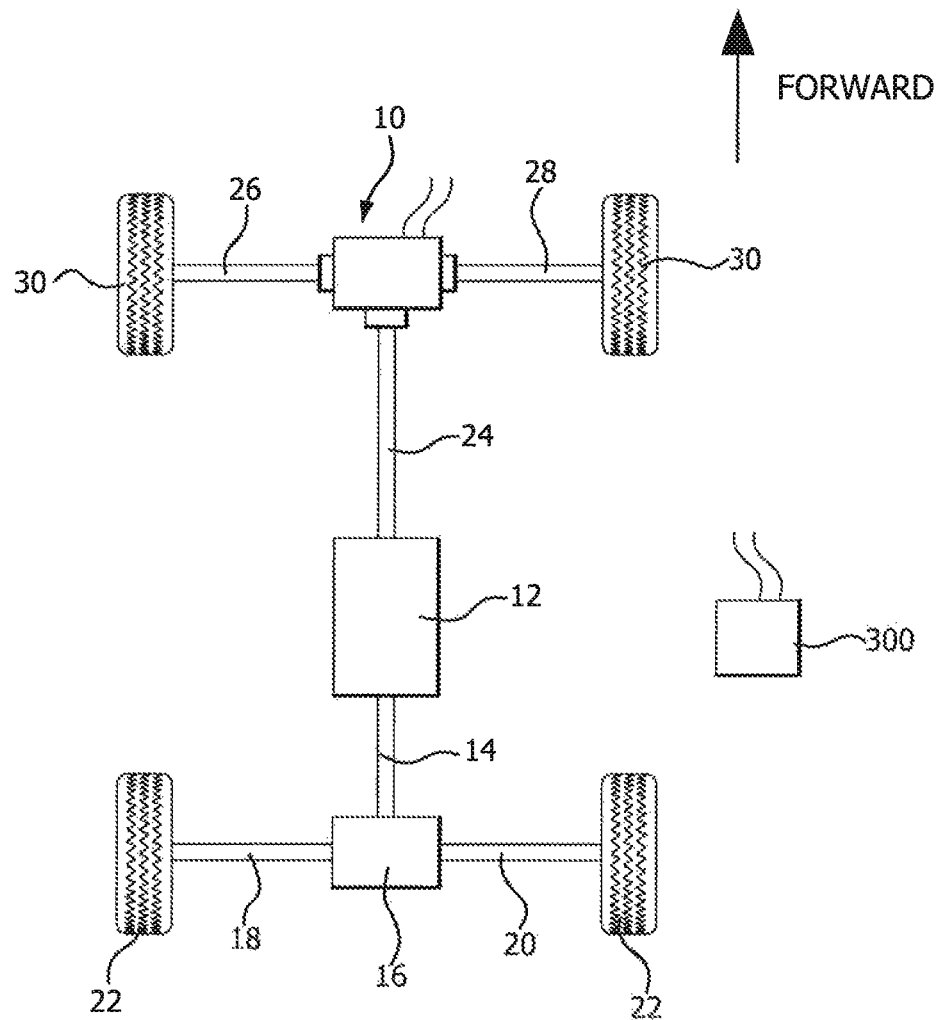
FIG. 1 is a schematic representation of one drive train embodiment in a vehicle incorporating the present invention.

Referring now to the drawings, wherein like reference numerals illustrate corresponding or similar elements throughout the several views, FIG. 1 is a schematic representation of one embodiment of a drive system incorporating a differential 10 according to an embodiment of the present invention. The drive system includes a transmission 12, a primary drive shaft 14, a primary differential 16, and first and second primary driven shafts 18, 20 which drive primary wheels 22.

The drive system also includes a secondary drive shaft 24 which is rotatably connected to the differential 10 as will be discussed below. The differential 10, in turn, rotatably drives two secondary driven shafts 26, 28 which are attached to wheels 30.

Figure 2:
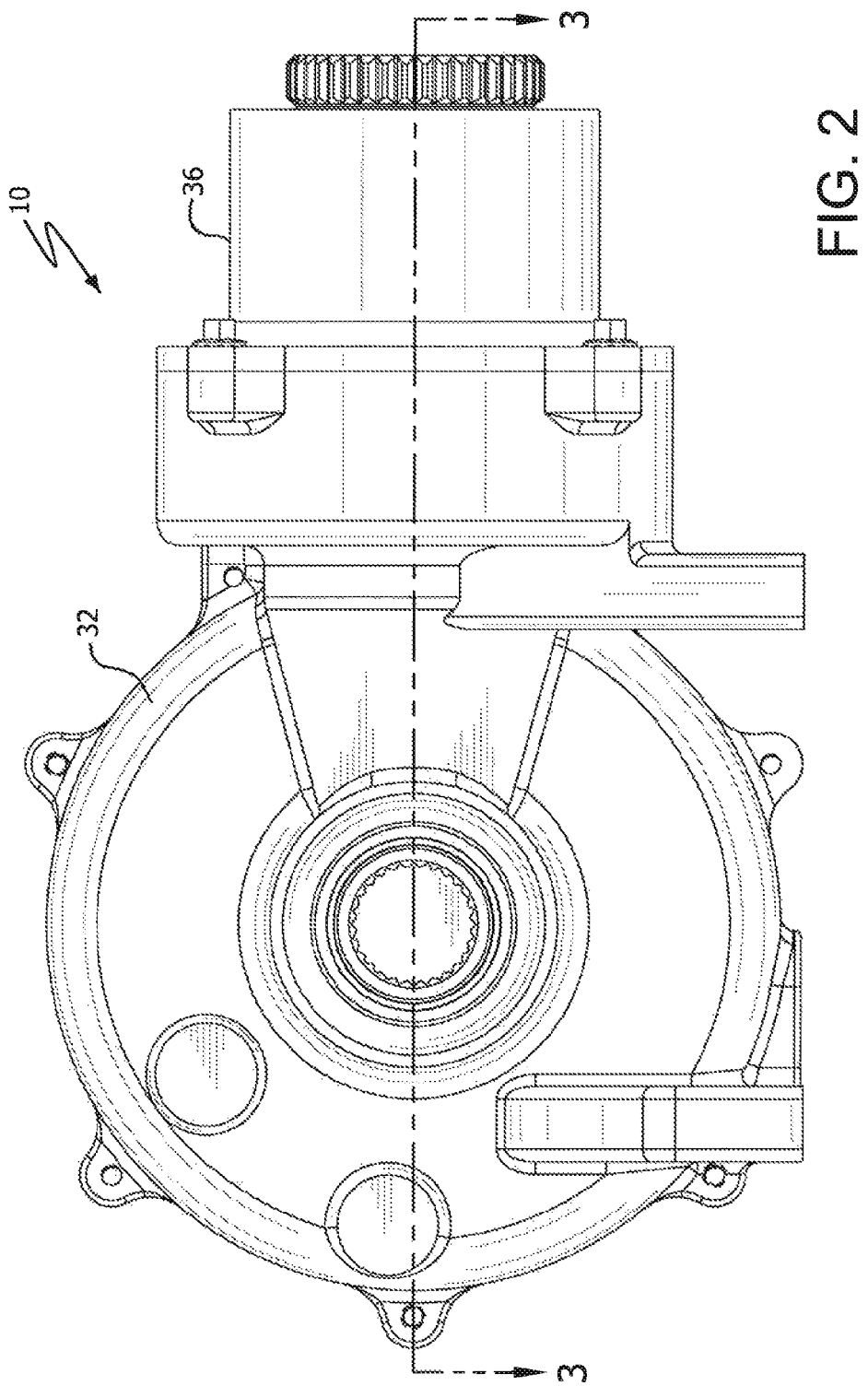
FIG. 2 is a side view of a differential according to the present invention.

The details of the differential 10 will now be described with respect to FIGS. 2 through 13D. FIG. 2 is side view of the differential drive 10 according to the present invention for transmitting torque from the driveshaft 24 to the two driven shafts 26, 28. The differential 10 includes a differential housing 32 with a ring gear cover 34 (in FIG. 3) and a pinion cover 36 that are separately bolted to the differential housing 32. The differential housing 32, ring gear cover 34, and pinion cover 36 include openings for permitting connections with the driveshaft 24 and driven shafts 26, 28.

Figure 3:
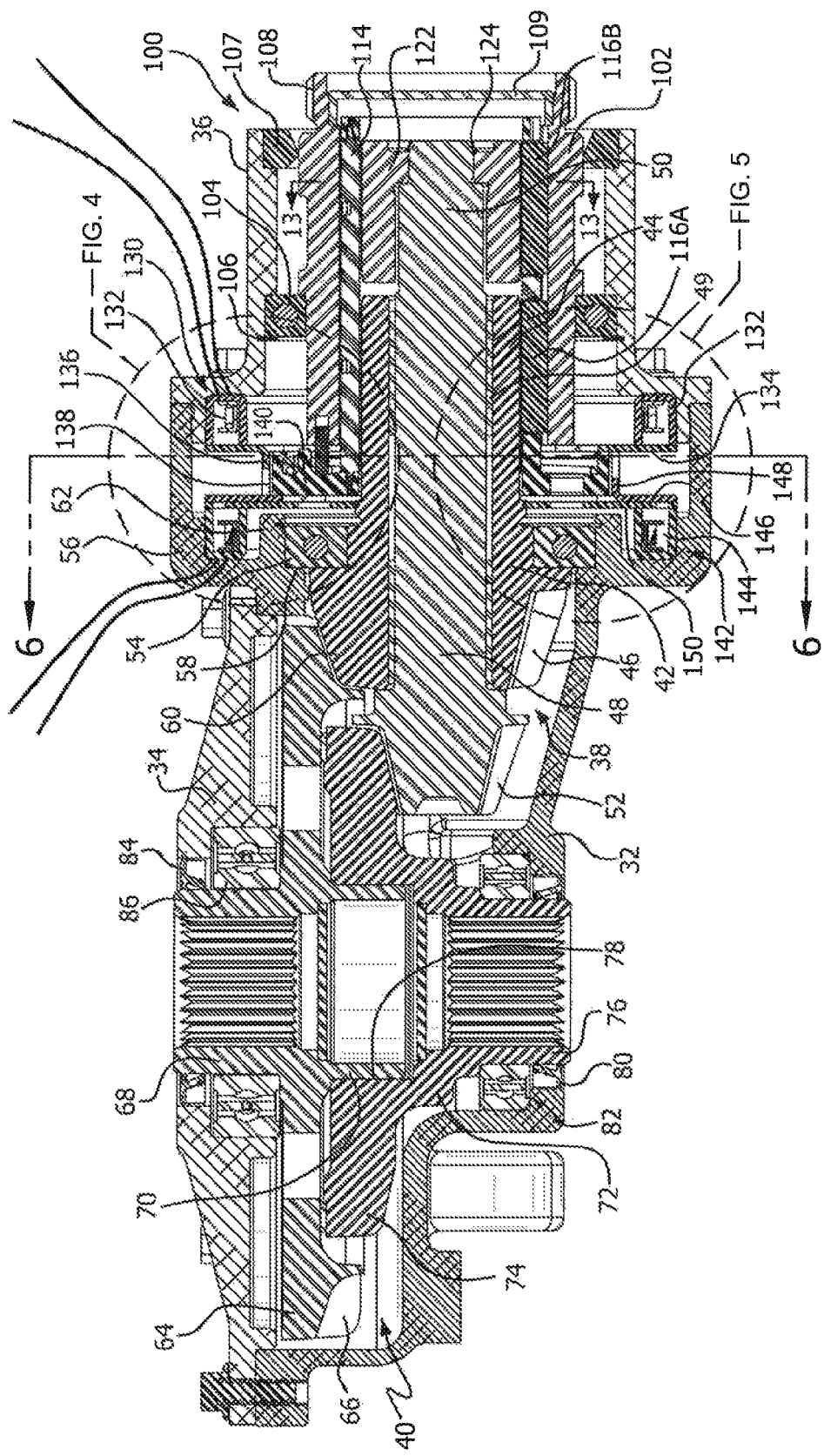
FIG. 3 is a cross-sectional view of the differential of FIG. 2 taken along lines 3-3.
Figure 4:
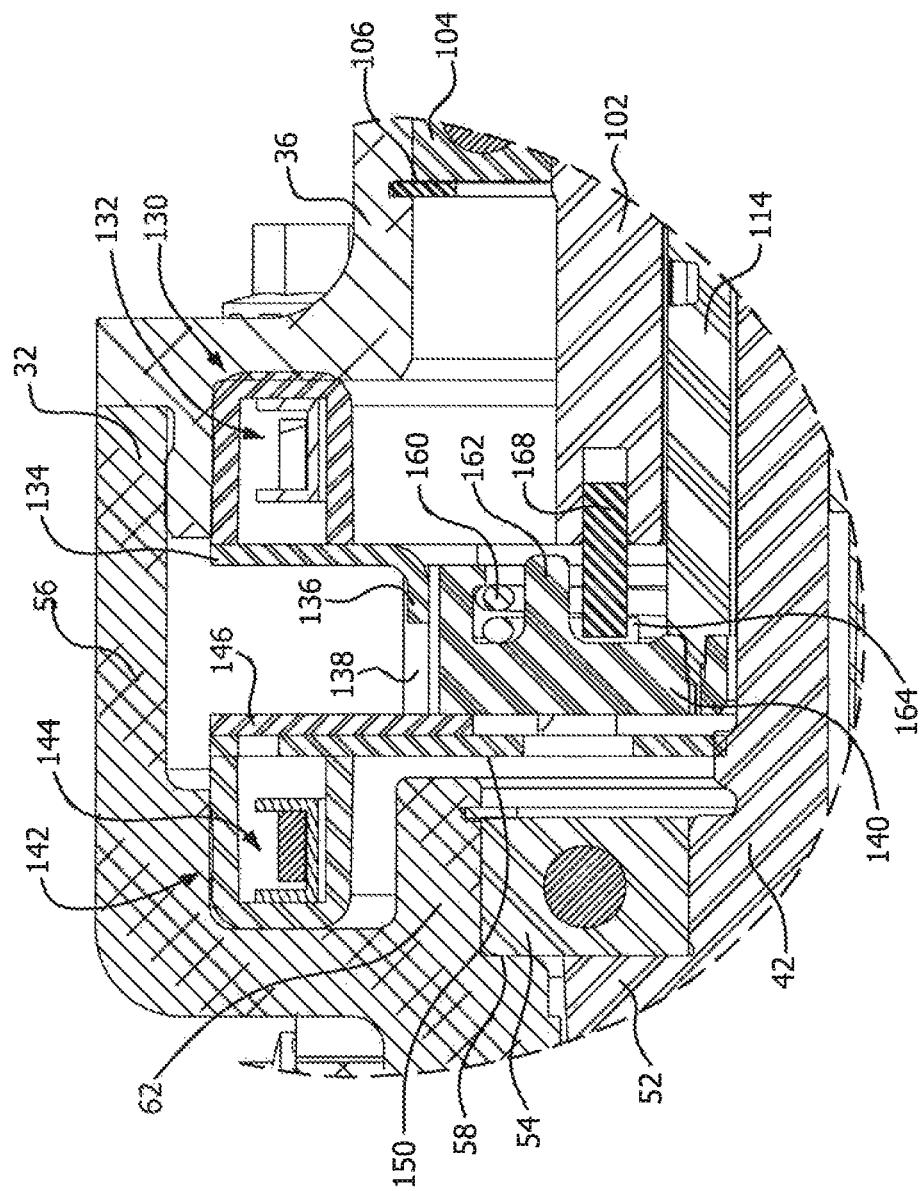
FIG. 4 is an enlarged view of a portion of FIG. 3.
Figure 5:
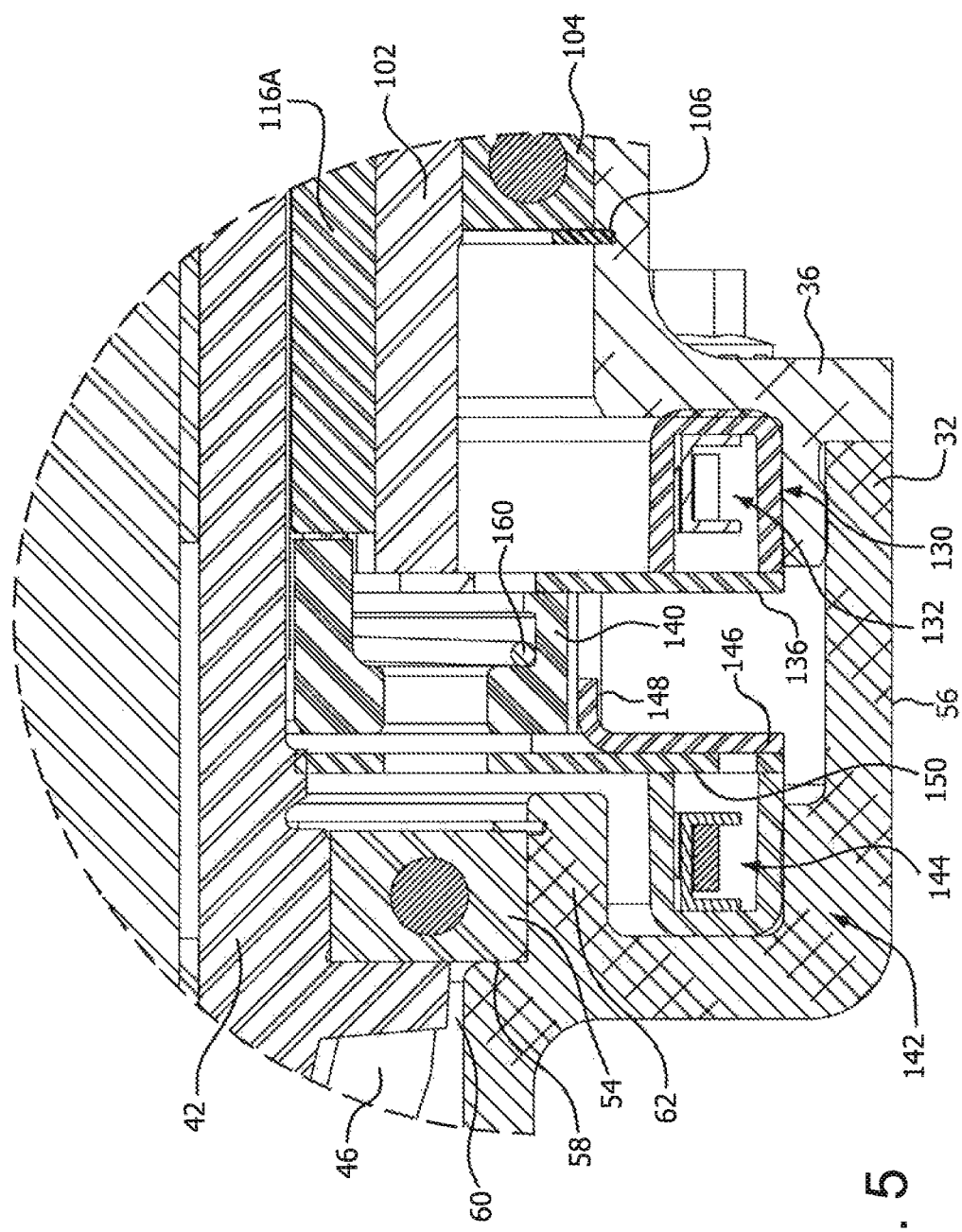
FIG. 5 is an enlarged view of a portion of FIG. 3.
Figure 6:
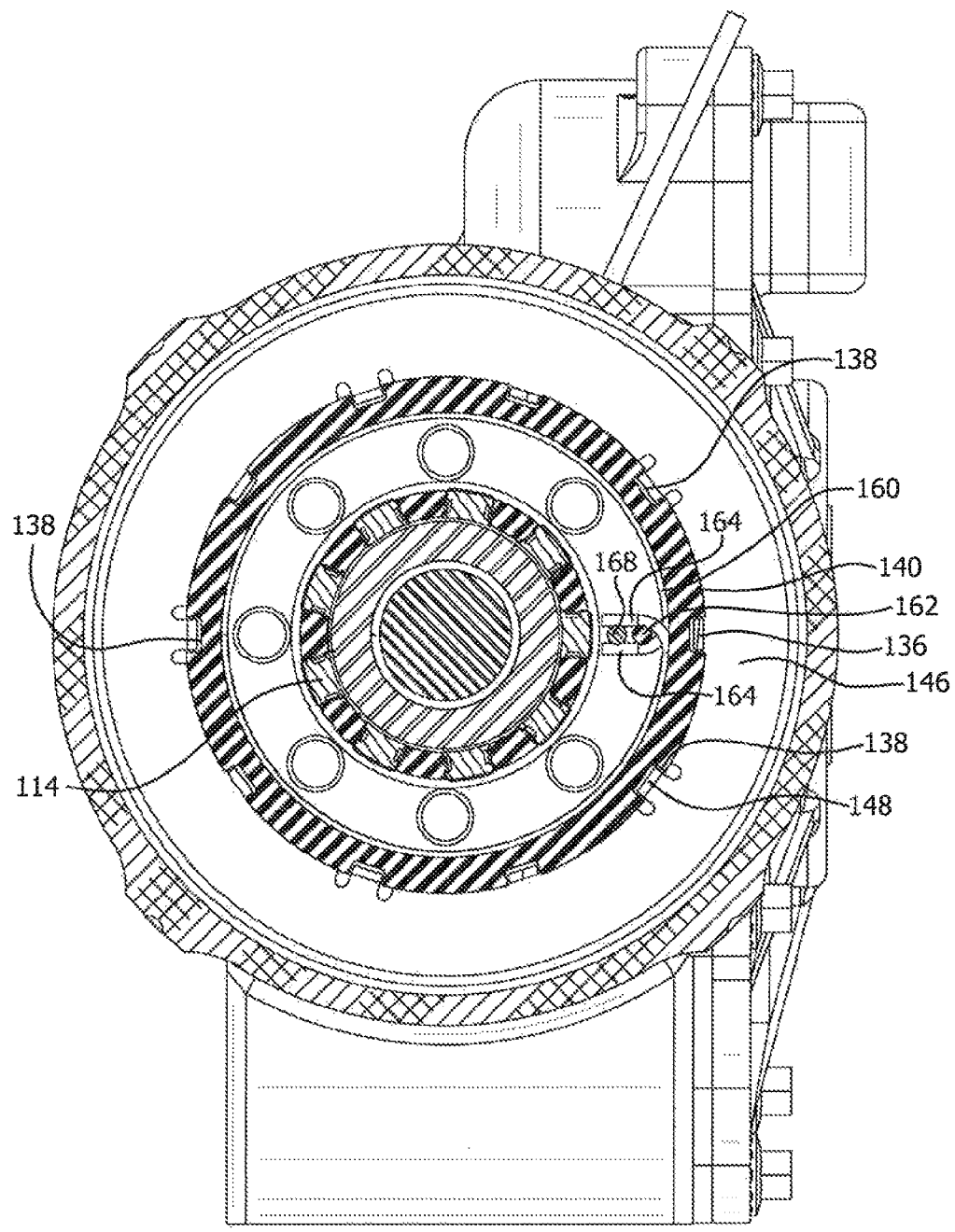
FIG. 6 is a cross-sectional view of the bi-directional overrunning clutch mounted about the co-axial input shafts.
Figure 7:
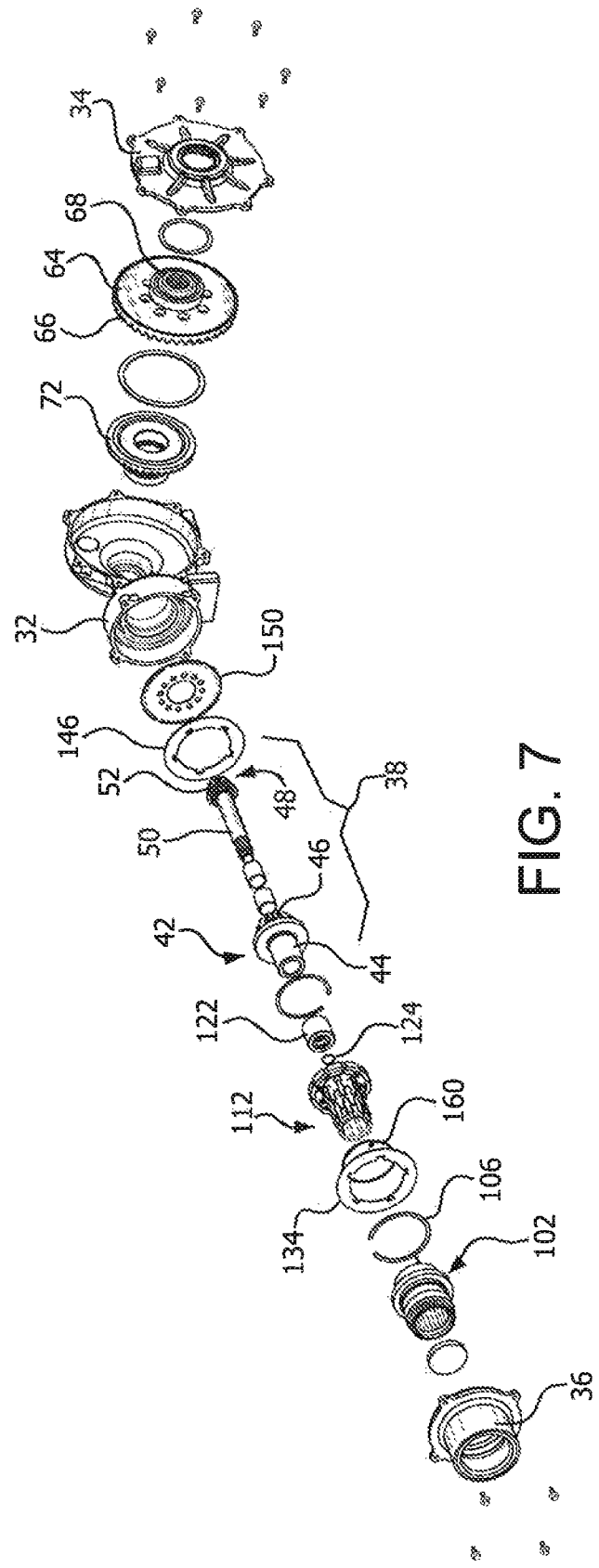
FIG. 7 is an exploded perspective view of the differential of FIG. 2.
Figure 8:
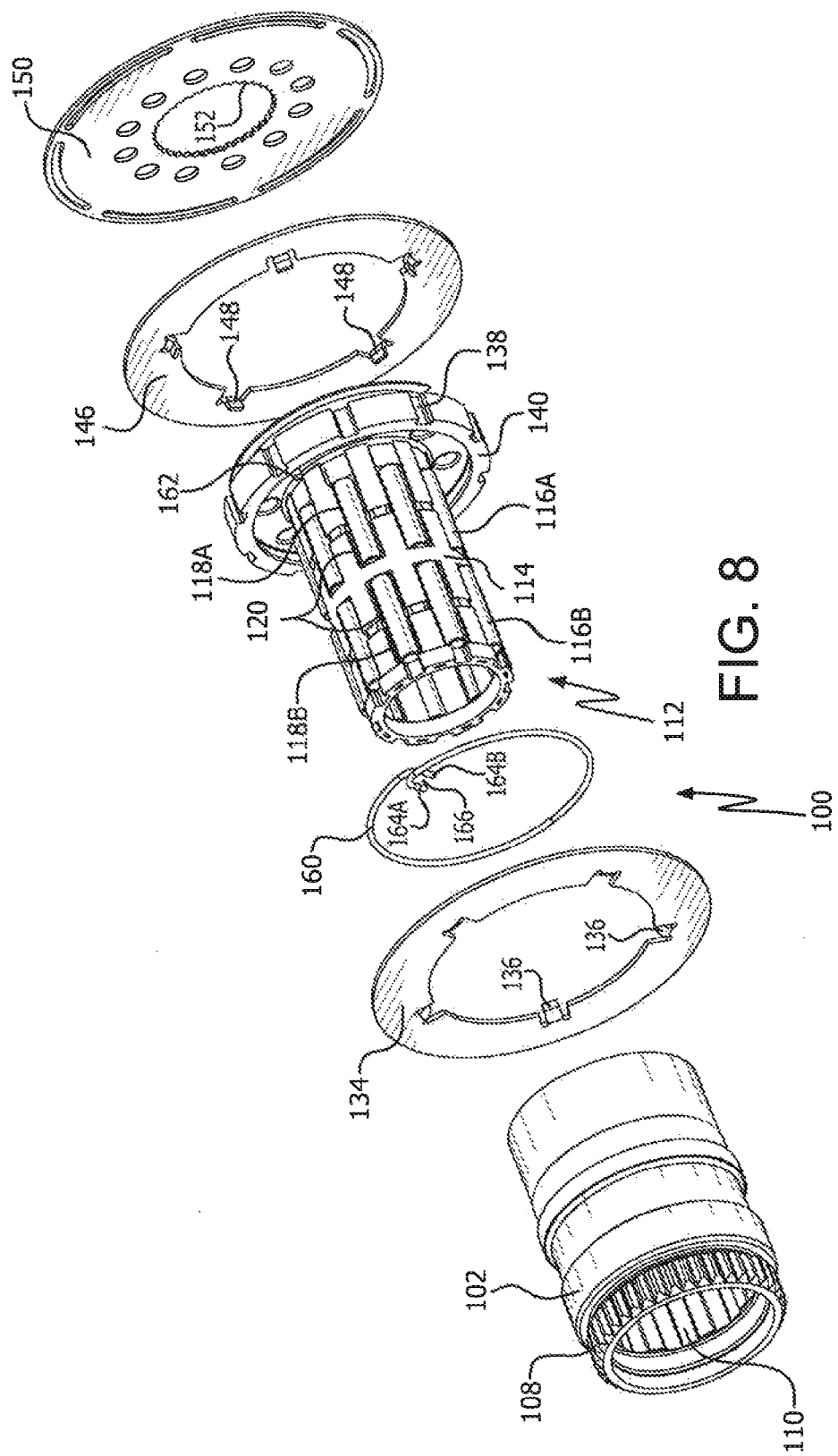
FIG. 8 is an exploded perspective view of the clutch assembly and armature plates.
Figure 9:
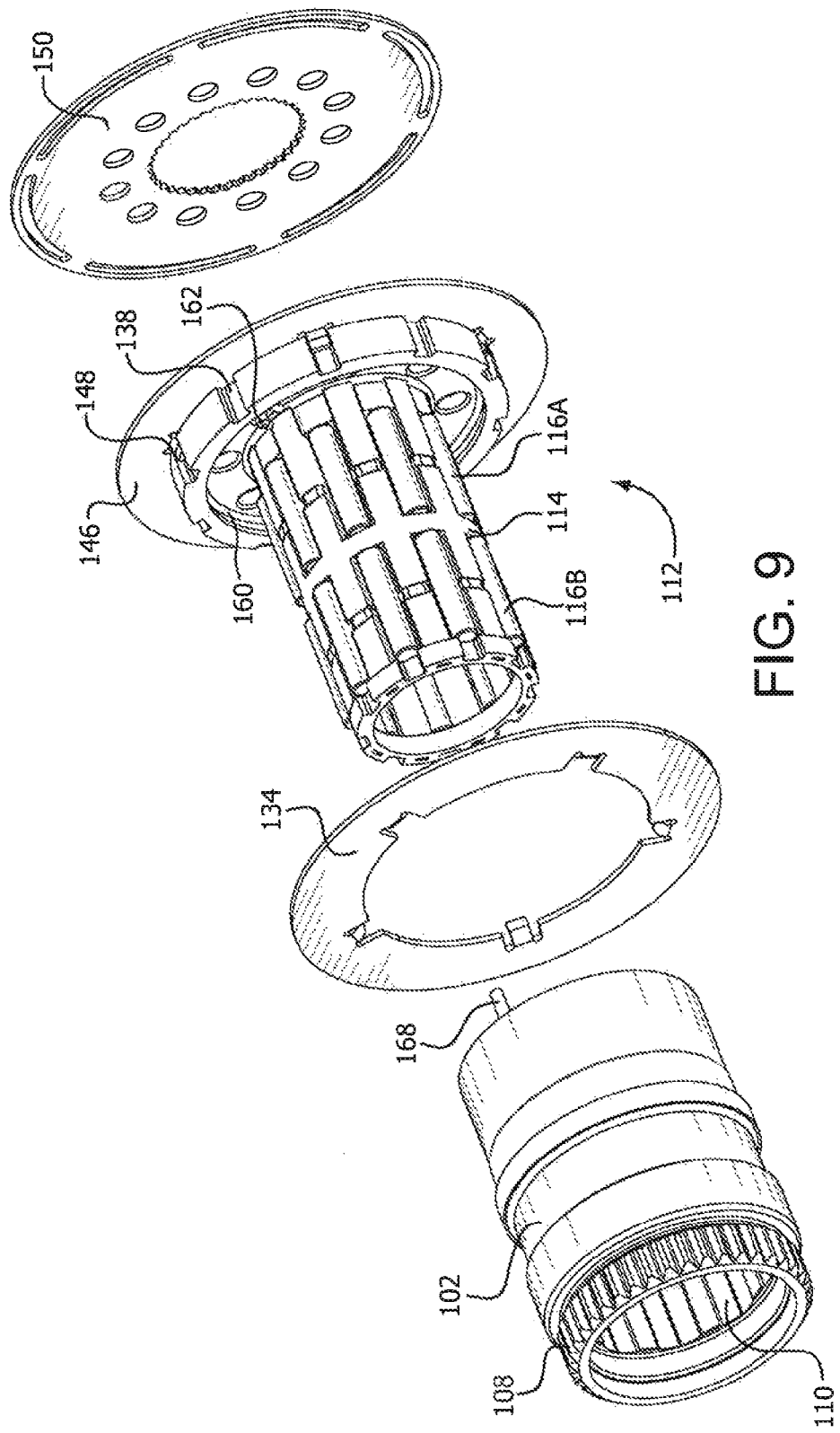
FIGS. 9 and 10 are views of the clutch assembly of FIG. 8 in different stages of assembly.
Figure 10:
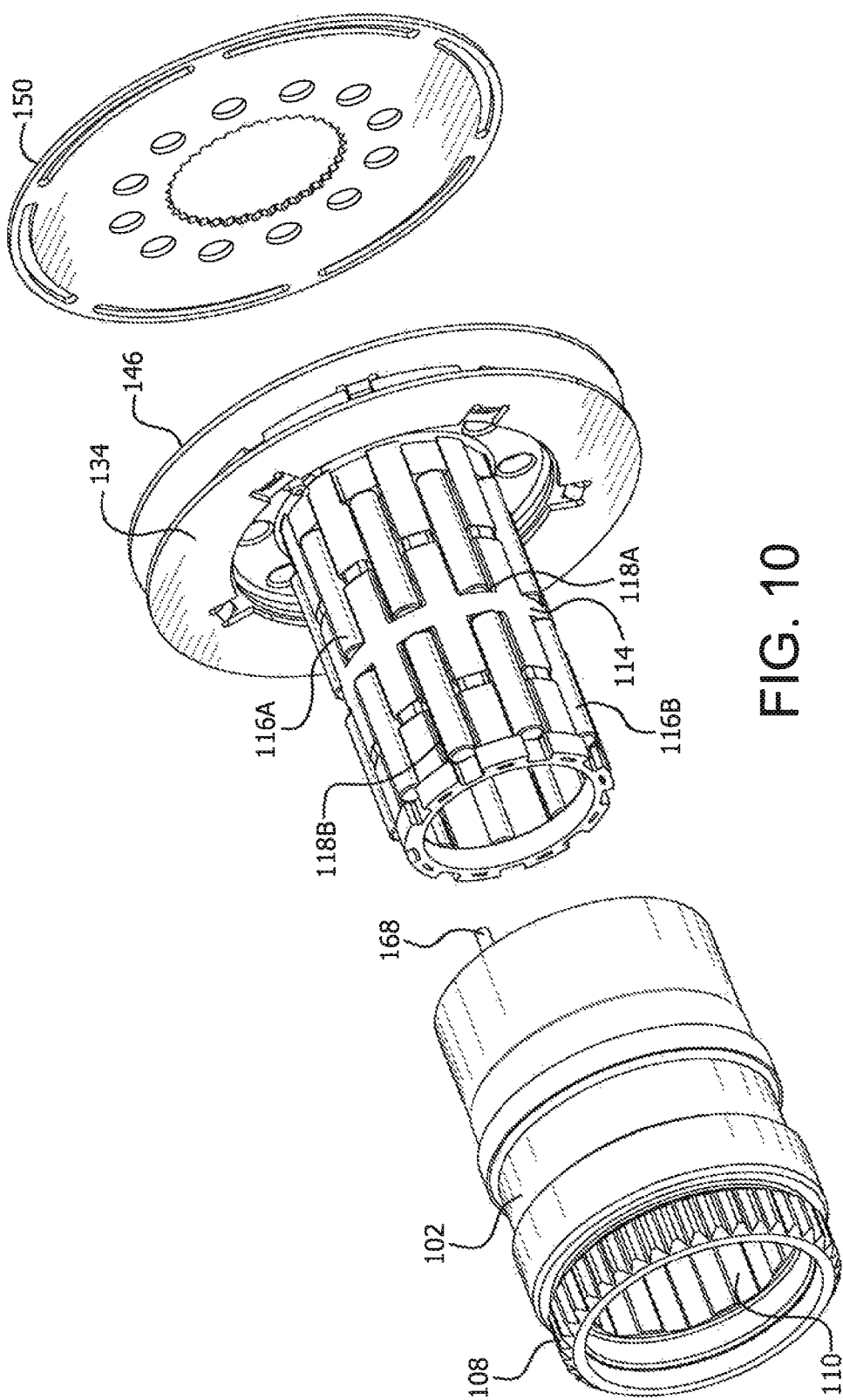
Figure 11:
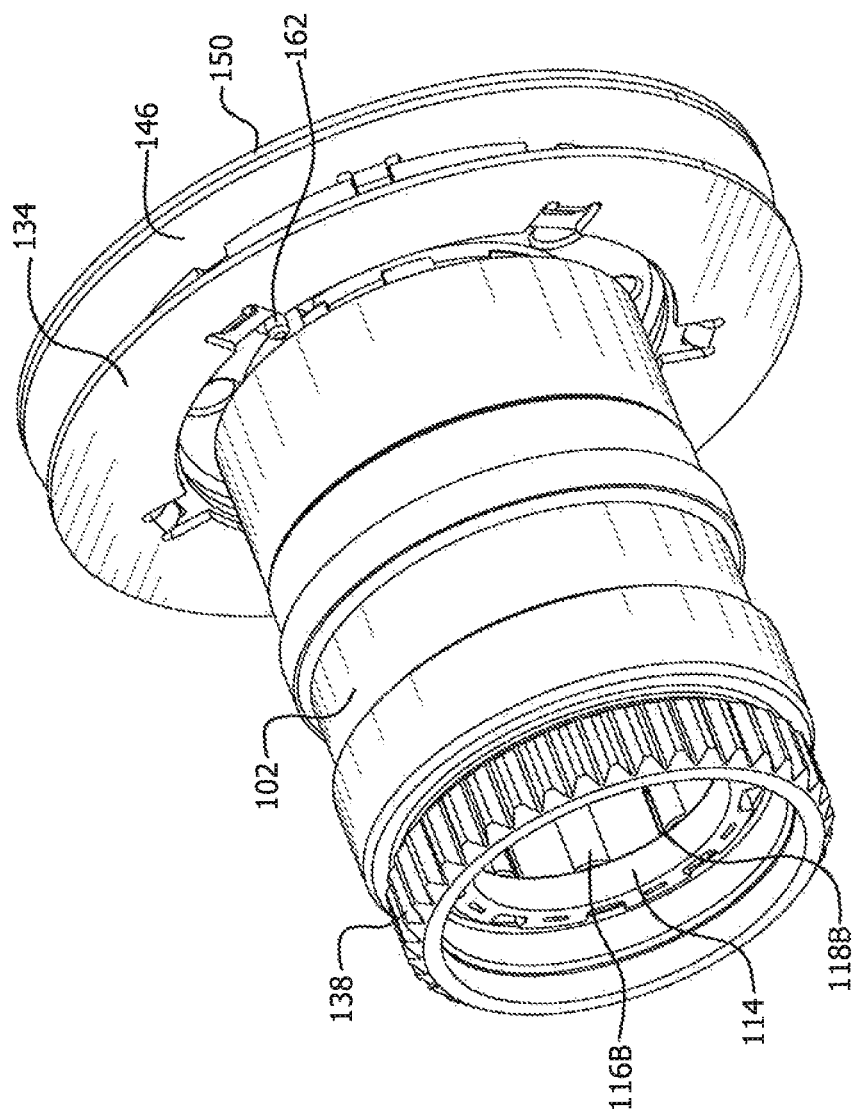
FIG. 11 is the clutch assembly of FIG. 8 fully assembled.
Figure 12A:
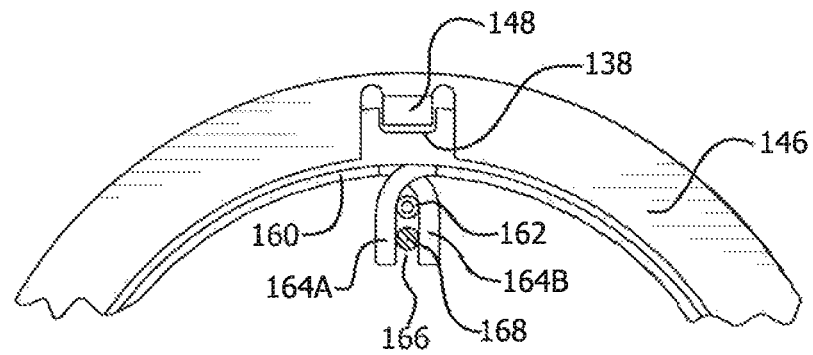
FIG. 12A illustrates the torsion spring assembly in a non-deflected state.
Figure 12B:
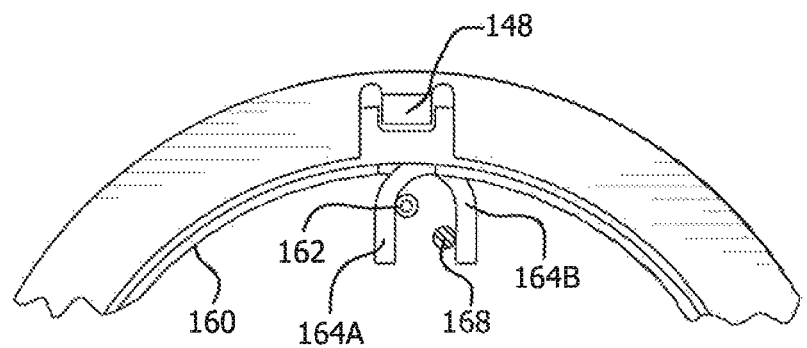
FIG. 12B illustrates the torsion spring assembly in its deflected state where the roll cage is indexed (advanced or dragged) relative to the clutch housing.

Referring to FIG. 3, a cross-sectional view of the differential 10 is shown. Further details of the differential can be seen in FIGS. 4-7. The differential 10 includes a pinion assembly 38 that meshes with a ring gear assembly 40 for transferring rotary motion between the driveshaft 24 and the driven shafts 26, 28. The pinion assembly 38 includes a first or outer pinion 42 with a pinion shaft 44 and a pinion gear 46, preferably a bevel gear, on an end. The pinion assembly 38 also includes a second or inner pinion 48 with a pinion shaft 50 and a pinion gear 52, preferably a bevel gear, on an end. The second pinion 48 is mounted concentrically within the first pinion 42 and is configured to be rotatable independent from the first pinion 42. In the illustrated embodiment, the shaft 50 of the second pinion 48 extends axially out from the shaft 44 of the first pinion 42. A hushing 49 is preferably located between the first and second pinions 42, 48 so as to facilitate relative movement between the two. Any suitable bushing can be used. In one embodiment, the bushing includes a rigid backing, such as steel, to permit the bushing to be pressed into the first pinion 42. The first pinion is mounted within the differential housing 32 through a bearing 54. Bearing 54 is preferably a ball or roller bearing. Specifically, the differential housing 32 includes a cup-shaped portion 56 with a bearing seat 58 formed about an axial opening 60. A retention flange 62 extends axially away from the seat 58. The bearing 54 is mounted on the seat 58 against the flange 62. The first and second pinion gears 46, 52 are located on one side of the bearing 54, and the first and second pinion shafts 44, 50 extend through to the opposite side of the bearing as shown. As such, the bearing 54 supports the pinion assembly 38 within the differential housing 32.

The ring gear assembly 40 includes a first ring gear 64 with gear teeth 66, preferably bevel teeth, a hub 68 and a stub shaft 70. The ring gear assembly 40 also includes a second ring gear 72 with gear teeth 74, preferably bevel teeth, a hub 76 and recess 78. As shown, the stub shaft 70 of the first ring gear 64 is disposed within the recess 78 of the second ring gear so as to arrange the first and second ring gears concentric with each other, rotating about the same axis. Each hub 68, 76 includes a set of splines which are configured to engage with mating splines on the driven shafts 26, 28 for transmitting rotation between the hubs and the driven shafts. The ring gears are preferably made from a suitable strong material, such as steel, although other materials could be used depending on the anticipated loads. As should be apparent, the first pinion and first ring gear combination drives one wheel, and the second pinion and second ring gear drives the other wheel.

As shown, the differential housing 32 includes a hole 80 through which the hub 76 of the second ring gear 72 can be accessed from outside the differential housing. An oil seal may be included between the hub 76 and the hole to prevent fluid leakage. The second ring gear 72 is supported inside the differential housing 32 by a bearing 82 mounted between the hub 76 and an inner wall portion of the differential housing 32. The ring gear cover 34 includes a hole 84 through which the hub 68 of the first ring gear 64 can be accessed from outside the differential 10. An oil seal may be included between the hub 68 and the hole 84 to prevent fluid leakage. The first ring gear 64 is supported by the ring gear cover 34 through a bearing 86 mounted between the hub 68 and an inner wall portion of the ring gear cover 34. Thus, the first and second ring gears 64, 72 are mounted so as to be rotatable within the differential housing 32.

As shown, the first pinion gear 46 meshes with the first gear teeth 66 so that rotation of the first pinion 44 produces corresponding rotation of the first ring gear 64. The second pinion gear 52 meshes with the second gear teeth 74 so that rotation of the second pinion 48 produces corresponding rotation of the second ring gear 72. As is evident, the first pinion and ring gear is mounted so as to be rotatably independent from the second pinion and ring gear, thus permitting them to rotate relative to one another.

In order to independently control the rotation of the pinions and ring gears 44/64, 48/72, the present invention incorporates a bi-directional overrunning clutch assembly 100. This assembly is shown in FIGS. 3-11. The clutch assembly 100 includes a clutch housing 102 located within the differential 10. The clutch housing 102 is mounted so as to be rotatable inside the differential 10. In the illustrated embodiment, that clutch housing 102 is mounted within the pinion cover 36 and supported by a bearing 104. The bearing 104 is retained on the pinion cover 36 by a locking ring 106. An oil seal 107 is preferably located between the pinion cover 36 and the clutch housing 102 for preventing fluid from escaping out of the differential.

In the illustrated embodiment, the clutch housing includes a splined end 108 that extends out of an opening in the pinion cover 36. The splined end 108 is configured to engage with the drive shaft 24 for transmitting rotary motion from the drive shaft 24 to the clutch housing 102.

The clutch housing 102 includes an internal diameter that preferably has a contoured or cam surface 110. A roller cage assembly 112 is located within the clutch housing 102 and includes a roll cage 114 with a plurality of rolls 116 rotatably disposed within slots 118 in the cage 114. More specifically, the roll cage 114 includes two independent sets of rolls $116_A$, $116_B$ disposed within two sets of slots $118_A$, $118_B$ formed in the roll cage 114 around its circumference. The roll cage 114 can be made from any suitable material that is sufficiently strong to withstand the applied loads, such as hardened anodized aluminum material or steel. Alternatively, the roll cage 114 can be made from plastic or composite material. The rolls 116 are preferably made from hardened steel material. The roll cage assembly 112 preferably includes a plurality of spring elements or clips 120 for positioning the rolls 116 in the slots 118. A variety of springs can be used in the present invention. In one embodiment, each spring clip is preferably substantially H-shaped with two independent springs that are attached to or formed on opposite sides of a bridge. The bridge separates each spring into two opposed arms. The arms are preferably curved or arcuate in shape such that the combination of the arms is concave, similar to the shape of a leaf spring. However, the arms may also be linear such that they combine with the bridge to form a Y shape. The bridge acts as a yoke to support the arms permitting them to bend independently from one another, as well as from the opposite spring.

Each slot 118 includes a spring from two adjacent spring clips, thus biasing the roller substantially into the center of the slot. The springs account for tolerances in the manufacturing of the various components so that the rollers all engage at the same time. Other spring mechanisms can be used in the present invention. U.S. Pat. Nos. RE38,012, 6,622,837, 6,629,590 and 6,722,484, which are incorporated herein by reference in their entirety, disclose spring arrangements and roll cage assemblies that can be used in the present invention.

Figure 13A:
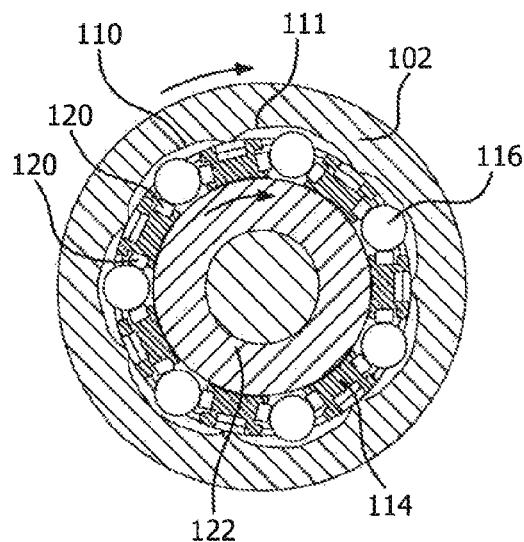
FIGS. 13A-13D illustrate various stages of indexing of the roll cage relative to the pinion shafts and the clutch housing.
Figure 13B:
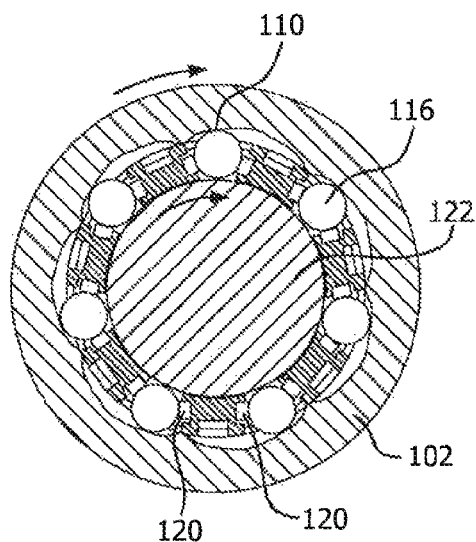
Figure 13C:
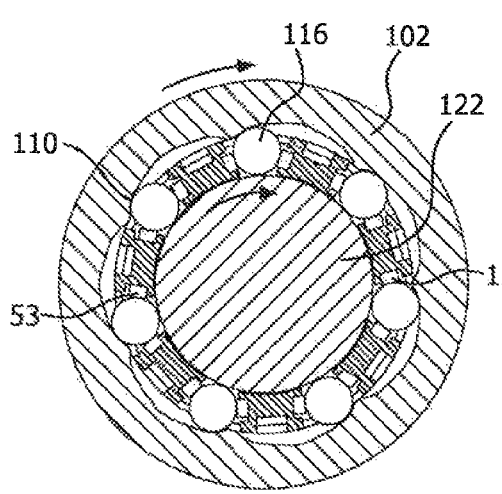
Figure 13D:
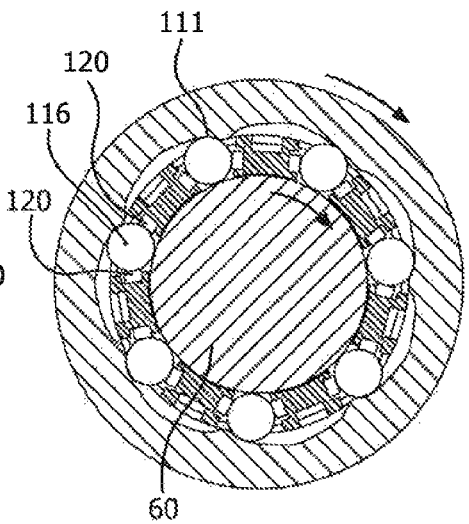

Each set of rolls $116_A$, $116_B$ is located adjacent to a portion of the inner cam surface 110 of the clutch housing 102. In one embodiment, the contour of the cam surface 110 is configured with a plurality of peaks and valleys (ramped or curved surfaces 111). When the roll cage 114 is located within the clutch housing 102 and the clutch is not activated, the rolls 116 are located within the valleys with the cam surface 110 tapering toward the cage on either side of the roll 116 (FIG. 13A). The cam surface 110 and rolls 116 provide the bi-directional overrunning capabilities as described in detail in U.S. Pat. Nos. 6,622,837, 6,629,590 and 6,722,484. Cam surfaces and roll cages in overrunning clutches are well known in the art. Hence, a detailed discussion of these features is not needed.

As shown in FIG. 3, the first set of the rolls $116_A$ is located between the clutch housing 102 and a portion of the first pinion shaft 44 so as to permit wedging engagement, and thus torque transfer between the clutch housing 102 and the first pinion 42.

A pinion hub 122 is attached to the second pinion shalt 50. In the illustrated embodiment, the pinion hub 122 is attached to the second pinion shaft 50 through splines so that the pinion hub and second pinion shaft 50 rotate together. The pinion hub 122 is preferably retained on the shaft 50 with a locking ring 124. The second set of the rolls $116_B$ is located between the clutch housing 102 and an outer surface of the pinion hub 122 so as to permit wedging engagement, and thus torque transfer, between the clutch housing 102 and the second pinion 48. A plug seal 109 is mounted to an extension of the clutch housing 102 and seals off the end of the housing to prevent lubricant from leaking out.

As discussed above, the engagement (wedging) of the rolls 116 with the clutch housing 102 and the first pinion shaft 44 and the pinion hub 122 permits the transfer of torque from the secondary drive shaft 24 to the first and second pinions 42, 48. However, during normal operation of the vehicle, the rolls 116 sit in the valley in the contoured surface 110 of the clutch housing 102 and, thus, do not provide for any torque transfer. In order to activate the overrunning clutch and, thereby, make the vehicle capable of engaging in four wheel drive and engine braking, the present invention incorporates an electromagnetic control system. More specifically, the present invention includes two or more roll cage adjustment devices or indexing devices which are electrically connected to an electronic control system 300. Each adjustment device preferably includes an electromagnetic coil assembly. The first indexing device (e.g., the electromagnetic drive activation device or electromagnetic drive coil assembly) is configured, when activated, to cause the roll cage to index into an active drive state (i.e., four wheel drive capability) where the rolls are positioned to cause the secondary drive shaft 24 be coupled to the secondary driven shafts 26, 28 when four wheel drive is needed. The second indexing device (e.g., the electromagnetic backdrive activation device or electromagnetic backdrive coil assembly) is configured, when activated, to cause the roll cage to index into an active backdrive state (i.e., engine breaking capability) where the rolls are positioned to cause the secondary driven shafts 26, 28 to be coupled to the secondary drive shaft 24 for providing torque transfer from the secondary driven shafts 26, 28 to the secondary drive shaft 24 during an engine braking condition. As discussed below, the second coil assembly is activated when the vehicle is decelerating or on a downhill.

In one embodiment, each electromagnetic indexing device includes a coil assembly with a coil in an annular steel coil pocket or housing and an armature plate engaged with the roll cage 114. The indexing devices control shifting or indexing of the roll cage 114 with respect to the clutch housing 102. The first indexing device 130 includes a drive coil assembly 132 that is preferably attached to the differential 10 at a location radially outward from the pinion assembly 38. In the illustrated embodiment, the drive coil assembly 132 is mounted to the pinion cover 36. The drive coil assembly 132 is preferably annular in shape with a central axis coincident with the axis of rotation of the roll cage 114. The drive coil assembly 132 is preferably a bobbin wound coil which includes a plastic base about which the coil is wound. Suitable coils for use in the present invention are well known to those skilled in the electric clutch art. The drive coil assembly 132 is preferably bonded or otherwise attached to the pinion cover 36.

A first armature plate 134 is located between the drive coil assembly 132 and the roll cage 114. The first armature plate 134 is preferably annular in shape and mounted so as to be capable of rotating with respect to the drive coil assembly 132 when the coil is not energized. The first armature plate 134 is attached to or engaged with the roll cage 114 so as to rotate in combination with the roll cage 114. In the illustrated embodiment, the first armature plate 134 is a separate component that is engaged with the roll cage 114. In one embodiment, the first armature plate 134 includes at least one and, more preferably a plurality of tangs or fingers 136 which protrude from the first armature plate 134 toward the roll cage 114. The tangs 136 engage with slots 138 formed in the roll cage 114. The first armature plate 134 is engaged with the roll cage 114 when the tangs 136 are engaged with the slots 138. Hence, when the drive coil assembly 132 is not energized, the first armature plate 134 rotates with the roll cage 114 relative to the differential housing 32.

In the illustrated embodiment, the slots 138 are formed in a spring retainer adapter 140 which, as will be discussed below, provides a connection between a torsion spring 160 and the roll cage 114. However, as will become apparent, the adapter 140 could alternately be connected to the first armature plate 134. The adapter 140 is an annular ring that is disposed about the pinion assembly 38 adjacent to the axially inward end of the roll cage 114. One side of the adapter 140 is located adjacent to a portion of the first armature plate 134. While the illustrated embodiment depicts the armature plate with tangs 136 that engage with slots 138 in the adapter plate, it should be readily apparent that the adapter 140 (or roll cage) may be formed with one or more protruding lugs or tabs that extend out of the side of the adapter 140 (or roll cage) and engage with mating notches formed in the first armature plate 134. The mating of the adapter 140 with the armature plate 134 provides a connection between the adapter 140 and the roll cage 114. The armature plate 134 is preferably made from steel material. While a separate armature plate 134 has been described above, it is also contemplated that armature plate can be attached to, formed on, or engaged with the roll cage 114 in any suitable manner so as to rotate in combination with the roll cage 114. Alternately, the armature plate 134 can be permanently or removably attached to the roll cage 114, or may simply be a surface on the roll cage 114 or the adapter 140.

When the drive coil assembly 132 is energized, an electromagnetic field is generated between the drive coil assembly 132 and the armature plate 134 attracting the armature plate 134 to the drive coil assembly 132, thus causing it to drag. Since the armature plate 134 is engaged with the roll cage 114 by the tangs 136 (through the adapter 140), the dragging of the armature plate 134 causes the roll cage 114 to also drag or retard.

The drive coil assembly 132 is connected to an electronic control system 300, through wires shown in FIG. 3. The wires are not shown in FIGS. 4 and 5 for simplicity. The control system 300 can be a programmed signal processor or manually activated electrical system, for controlling the energizing of the coils. Other types of control systems can also be used in the present invention. (The electronic control system is generally identified by the numeral 300 in FIG. 1 and described in more detail below.) The control system could be programmed to activate/deactivate the coils in various ways.

The second indexing device 142 includes a backdrive coil assembly 144 that is preferably attached to the differential housing 32 at a location radially outward from the pinion assembly 38. The backdrive coil assembly 144 is preferably similar to the drive coil assembly 132 and is annular in shape with a central axis coincident with the axis of rotation of the roll cage 114. The backdrive coil assembly 144 is preferably bonded or otherwise attached to the differential housing 32.

A second armature plate 146 is located between the backdrive coil assembly 144 and the roll cage 114. The second armature plate 146 is preferably annular in shape and is mounted so as to be capable of rotating with respect to the backdrive coil assembly 144 when the coil is not energized. The second armature plate 146 includes at least one and, more preferably a plurality of tangs or fingers 148 which protrude from the second armature plate 146 toward the roll cage 114. The tangs 148 engage with slots formed in the roll cage 114. In one embodiment the slots are the same slots 138 that the tangs on the first armature plate engage. As with the first armature plate 134, the second armature plate 146 is engaged with the roll cage 114 when the tangs 148 are engaged with the slots. In the illustrated embodiment, the slots 138 are formed in the adapter 140 on the roll cage 114. Hence, when the backdrive coil assembly 144 is not energized, the second armature plate 146 rotates with the roll cage 114 relative to the differential housing 32. The second armature plate 144 is preferably made from steel material. As with the first armature plate 132, the second armature plate 144 can be engaged to the roll cage 114 in other manners. For example, while the second armature plate 144 has been described above as a separate component from the roll cage 114, it is also contemplated that second armature plate can be attached to, formed on, or engaged with the roll cage 114 (or adapter 140) so as to rotate in combination with the roll cage 114. Alternately, the second armature plate 144 can be permanently or removably attached to the roll cage 114, or may simply be a surface on the roll cage 114 (or adapter). It is also contemplated that a single armature plate can be used in the present invention with two independently controlled coil assemblies mounted in a common cover or housing. It is also contemplated that two armature plates could be interlocking with drive feature(s) but only one of the armature plates is interacting with the roll cage.

A pinion plate 150 is positioned between the backdrive coil assembly 144 and the second armature plate 146. The pinion plate 150 is engaged with the first pinion 42. Specifically the pinion plate 150 is annular in shape and includes, in one preferred embodiment, teeth 152 (see FIG. 8) around an inner diameter that engage with splines formed on an outer surface of the first pinion 42. Thus, as the first pinion 42 rotates the pinion plate 150 rotates with it. Other mechanisms can be used to engage the pinion plate 150 to the first pinion 42. An upper portion of the pinion plate 150 is located adjacent to the backdrive coil assembly 144 and the second armature plate 146.

When the backdrive coil assembly 144 is energized, an electromagnetic field is generated between the backdrive coil assembly 144, the pinion plate 150 and the second armature plate 146 attracting the pinion plate 150 and second armature plate 146 to the backdrive coil assembly 144. Since the pinion plate 150 is coupled to the first pinion 42, the activation of the backdrive coil assembly 144 magnetically holds the second armature plate 146 to the first pinion 42 thus causing it to want to rotate with the first pinion 42. Also, because the second armature plate 146 is engaged with the roll cage 114 by the tangs 148, the magnetic engagement of second armature plate 146 causes the roll cage 114 to advance relative to the clutch housing 102 as the first pinion 42 rotates. The backdrive coil assembly 144 is also connected to the electronic control system 300.

The indexing systems above are configured to move the roll cage 114 in a prescribed direction relative to the clutch housing 102 when a certain state of operation is desired (four wheel drive or engine braking). Features of the indexing assembly can be found in co-pending U.S. Provisional Application No. 61/783,125, titled "Bi-Directional Overrunning Clutch with Improved Indexing Mechanism," the disclosure of which is incorporated herein by reference in its entirety.

In order to position the roll cage 114 within the clutch housing 102 so that the rolls 116 are centered within the cam surface 110 (i.e., not positioned for engagement), the clutch assembly 100 includes a torsion spring assembly that is designed to bias the roll cage 114 to a neutral position (with the rolls centered in the valley of cam surface 110). The torsion spring assembly includes a torsion spring 160 which is located against the adapter 140. The adapter 140 includes a protrusion or pin 162 (FIG. 4) that extends out from one side of the adapter 140 toward the clutch housing 102. In the illustrated embodiment the adapter pin 162 is depicted as being integral with the adapter 140. However it is also contemplated that the adapter pin 162 could be attached to the adapter 140.

The torsion spring 160 is generally circular in shape with its ends overlapping. The overlapping ends of the torsion spring 160 each include an arm 164 that extends at a generally right angle to where it attaches to the spring 160. The ends of the torsion spring overlap such that the arms 164 on the torsion spring 160 extend past one another defining a gap 166. A clutch pin 168 extends outward from the clutch housing 102 and is captured in the gap 166 with the arms 164 on either side of the clutch pin 168. The arms 164 are also on either side of the adapter pin 162 which is located above the clutch pin 168. See, FIGS. 12A-12B. Thus, the adapter 140 acts to retain the torsion spring 160 on the roll cage 114.

When the first indexing device is energized it hinders the rotation of the armature plate 134, thus hindering the roll cage 114 and adapter 140 relative to the clutch housing 102. This causes the adapter pin 162 to move one of the spring arms 164A away from the other spring arm 164B (which is held stationary by the clutch pin 168.) See, FIG. 12B. This movement causes the torsion spring 160 to deflect at which point the spring force of the torsion spring acts against the adapter pin 162 to bias it back toward the clutch pin 168 and the neutral position of the roll cage 114.

The incorporation of a torsion spring provides a reliable mechanism for returning the roll cage 114 to its neutral position, preventing unwanted wedging of the rolls between the cam surfaces and the pinions. The torsion spring 160 also prevents premature engagement that could potentially occur in some designs. Also, the use of a torsion spring 160 reduces the need for the roll springs 120 to be designed to bias the roll cage into a neutral position. Thus, the operational life of the roll springs 120 is increased.

The operation of the differential will now be discussed. Under normal operation (two-wheel drive mode), the electronic control system 300 does not send any signals to energize the coil assemblies. Accordingly, the vehicle is propelled by the primary drive shaft 14 and primary driven shafts 18, 20. The secondary drive shaft 24 rotates the clutch housing 102. Since coils are not energized, the torsion spring assembly maintains the roll cage 114 in a relatively neutral or unengaged position (non-activated position). See, FIG. 13A. In this position, the rolls 116 are not wedged between the tapered portions 111 of the cam surface 110 of the clutch housing 102 and the pinion assembly. As such, there is no driving engagement between the clutch housing 102 and either of the pinions 42, 48. Instead, the rolls 116 and roll cage 114 rotate with the clutch housing 102, independent from the pinion assembly 38. In this mode of operation, the secondary driven shafts 26, 28 do not drive the wheels but, instead, are driven by the wheels 30.

When it is desired to operate the vehicle such that four wheel drive is available when needed (four-wheel drive capability mode or on-demand), the electronic control system 300 is activated. Preferably, the activation is provided by manually actuating a button on the vehicle console, although the system can be automatically activated if desired. The electronic control system 300 sends a signal to energize the first or drive coil assembly 132. (The second or backdrive coil assembly 142 is not energized in this mode of operation.) As discussed above, the energizing of the drive coil assembly 132 creates an electromagnetic field between the drive coil assembly 132 and the first armature plate 134 which indexes the roll cage 114, thereby placing the rolls in position to wedge when needed. The rolls $116_A$ are located near to but not wedged between the tapered portions 111 of the cam surface 110 and the outer surface of the first pinion shaft 44. The rolls $116_B$ are located near to but not wedged between the tapered portions of the cam surface 110 and the outer surface of the pinion hub 122. See, FIG. 13B. The difference in rotational speed between the secondary drive shaft 24 and the output shafts 26, 28 maintains the rolls 116 in an overrunning mode. As such, the vehicle continues to operate in two-wheel drive (i.e., driven by the primary drive shaft 14).

When the wheels 22 driven by the primary drive shaft 14 begin to slip, the rotational speed of the secondary drive shaft 24 and the output shafts 26, 28 begin to equalize relative to the ground (assuming the output shafts 26, 28 are configured so as to be underpowered), since ground speed controls four-wheel drive and overrunning engagement. As such, the clutch housing 102 starts to rotate faster than the output shafts 26, 28 and the first pinion shaft 44 and pinion hub 122. This change in relative speed between these components causes the rolls $116_A$ to wedge between the first pinion shaft 44 and the tapered portion of the cam surface 110, and the rolls $116_B$ to wedge between the pinion hub 122 and the tapered portion of the cam surface 110. See, FIG. 13C. As a result, torque is transmitted from the clutch housing 102 to the pinion assembly and the vehicle is now operating in four-wheel drive (i.e., the primary driven shafts 18, 20 and secondary driven shaft 26, 28 are driving the wheels 22, 30). The drive system will stay in four-wheel drive until the wheels 22 on the primary drive shaft 14 stop slipping, at which point the output shafts 26, 28 once again overrun the clutch housing 102 and rolls 116 disengage. The ability of the present invention to engage and disengage the secondary driven shafts when needed allows the system to provide immediate four-wheel drive capability in both forward and rear directions.

Another feature of the differential assembly 10 according to the present invention is that, even when the vehicle is operating in four-wheel drive capability mode, i.e., when torque is transmitted to the secondary driven shafts 26, 28, the sets of rolls 116 can independently disengage (overrun) from the clutch housing 102 when needed, such as when the vehicle enters into a turn and the wheel on one secondary driven shaft 26 rotates at a different speed than the wheel on the other secondary driven shaft 28. As such, the differential 10 provides the drive system with the advantages of an open differential in cornering without traction loss, and the advantages of a locking differential when in four-wheel drive.

The present invention also provides engine braking capability (backdriving mode) for use when driving the vehicle down steep inclines. In the backdriving mode, the secondary driven shafts 26, 28 are engaged with the secondary drive shaft 24 and actually drive the secondary drive shaft 24. This is important since the front wheels generally have better traction than the rear wheels when the vehicle is descending down a steep slope in a forward direction. The present invention takes advantage of this occurrence and engages the front wheels (via the secondary driven shafts 26, 28) with the secondary drive shaft 24 (via the clutch assembly 100 and pinion assembly 38) such that front wheels control the rotation of the secondary drive shaft 24. This produces engine braking, thereby assisting in slowing down the vehicle.

The backdriving mode is preferably controlled by a throttle position sensor. The throttle position sensor is designed such that, when in the clutch assembly 100 is in its drive state, the vehicle will be in four wheel drive when the throttle is depressed. When the throttle is released and the vehicle begins to decelerate, the electromagnetic backdrive coil assembly 144 is automatically energized (and preferably the electromagnetic four wheel drive coil assembly 132 deenergized) placing the clutch assembly 100 in the backdrive mode. It is contemplated that one skilled in the art could use other means to sense when backdrive is needed, such as a traction sensor, and then send a signal to the electronic control system 300 when backdriving is needed. Alternatively, the electromagnetic backdrive coil assembly 144 could be manually engaged by the operator of the vehicle by depressing a button on the vehicle console which sends a signal to the electronic control system 300 to energize the backdrive coil assembly 144. This creates a magnetic field that causes the second armature plate 146 to magnetically engage with the pinion plate 150. Since the driven shafts 26, 28 are rotating faster than the clutch housing 102, this causes the roll cage 114 to advance relative to the housing 102. This results in the sets of rolls 116 becoming wedged between the outer surface of the first pinion shaft 44 and the pinion hub 122, and the tapered portions 111 of the cam surfaces 110 on the clutch housing. See, FIG. 13D. As such, the wheels 30 on the secondary driven shafts 26, 28 are directly connected to the secondary drive shaft 24 and become the input to the gear box, thereby locking the entire gear train together. In this mode, both front wheels are engaged, but unlike a locked front drive, the front inside wheel is allowed to under-run in a turn, thus allowing for speed differentiation between the two output hubs.

In the backdriving mode, when the vehicle is no longer descending the hill, the speed of the driven shafts 26, 28 will decrease. Since the backdrive coil assembly 144 is still energized, it will (in combination with the bias of the torsion spring 160) drag roll cage 114 toward its neutral position, but will not be limited to staying in the neutral position. The configuration of the system also prevents underpower in the backdrive mode. That is, if a wheel is rotating at less than ground speed, the advancing of the roll cage 114 permits the rolls to disengage so as to permit the slower wheel to not drive the system. The unique construction of the differential according to the present invention permits it to be used in a vehicle with or without power steering. While power steering provides advantages in a drive system that includes the bi-direction overrunning clutch, it is not a necessity.

In order to provide for proper lubrication of the bearings 54, 86 and clutch assembly 112, the present invention preferably incorporates through holes in the pinion plate 150, adapter 140, and first ring gear 64 so as to permit passage of oil from one side of those components to the other.

As should be apparent from the above description, the present invention provides an innovate differential assembly that is useful in a switchable four-wheel drive system, i.e., a system that can be switched from a two-wheel drive system to a four-wheel drive system depending on need.

It is also contemplated that the cam surface 110 need not be formed on the clutch housing 102 but, instead, can be formed on the first pinion shaft 44 and/or the pinion hub 122. Also, the clutch assembly described above can be easily modified to use sprags instead of rolls. A person skilled in the art could readily make these substitutions in light of the above teachings.

Also, while the indexing devices are described in the preferred embodiment as being coil assemblies, the invention contemplates that other electromechanical indexing systems can be used, including solenoids that can be electrically controlled to engage the armature plates or roll cage, hydraulically actuated friction plates, or other mechanical, electrical, hydraulic or pneumatic devices which drag and advance the roll cage. Those skilled in the art would be readily capable of incorporating such systems into the differential assembly in light of the above teachings.

The present invention allows for a smaller bi-directional overrunning clutch than the assemblies shown in U.S. Pat. Nos. RE38,012, 6,622,837, 6,629,590 and 6,722,484 since there is less torque at the location of the overrunning clutch prior to the input pinions. The illustrated embodiment also provides for a narrower, more compact differential design, which is beneficial since it results in a smaller joint angle for the axle shaft, thereby reducing the stress on the axles and increasing the range of motion of the joint.

The use of two gear sets also results in the drive shaft torque being shared, thereby improving the life of the gears in the differential.

As noted above, the present design permits a smaller bi-directional overrunning clutch differential than conventional designs, which provides for a significant benefit in the design of four wheel drive vehicles. However, in order to function most efficiently, the gear ratios for the first and second pinion assemblies needs to be substantially identical (i.e., within approximately 2%). If the ratios are not close, then the vehicle operator may experience torque steer, tire scrubbing, unwanted drivetrain vibrations, increased transmission loads, and understeer during cornering (i.e., a tendency to go straight). These can all happen driving in a straight line or in a turn with the clutch engaged. All of that could greatly reduce the life of the drivetrain components.

The present invention has usefulness as a primary drive system, as well as in combination with a four wheel drive system, such as the one disclosed in U.S. patent application Ser. No. 13/955,248, titled "True Four Wheel Drive System for Vehicle," the disclosure of which is incorporated herein by reference in its entirety.

Although the present invention has been described and illustrated with respect to the exemplary embodiments thereof, it should be understood by those skilled in the art that the foregoing and various other changes, omissions and additions may be made therein and thereto, without parting form the spirit and scope of the present invention.

The invention claimed is:

1. A front differential for a four wheel drive vehicle, the front differential comprising:

a differential housing;

a pinion assembly including a first pinion with a pinion shaft and a pinion gear on an end, and a second pinion with a pinion shaft and a pinion gear on an end, the second pinion being mounted concentrically within the first pinion and is configured to be rotatable independent from the first pinion;

a ring gear assembly engaged with the pinion assembly for transferring rotary motion between a drive-shaft and two driven shafts, the ring gear assembly including a first ring gear with gear teeth, a hub and a stub shaft, and a second ring gear with gear teeth, a hub and recess, the stub shaft of the first ring gear being disposed within the recess of the second ring gear so as to arrange the first and second ring gears concentric with each other and adapted to rotate about the same axis, each hub including a set of splines which are configured to engage with mating splines on one of the driven shafts for transmitting rotation between that hub and the associated driven shaft, the first and second ring gears being mounted so as to be independently rotatable within the differential housing;

the first pinion gear engaged with the first ring gear teeth so that rotation of the first pinion produces corresponding rotation of the first ring gear, the second pinion gear engaged with the second ring gear teeth so that rotation of the second pinion produces corresponding rotation of the second ring gear, the first pinion and first ring gear combination mounted so as to be rotatable independent from the second pinion and second ring gear combination, thus permitting one to rotate relative to the other, the first pinion and first ring gear combination adapted to rotate one of the driven shafts, and the second pinion and second ring gear combination adapted to rotate the other of the driven shafts;

a bi-directional overrunning clutch assembly comprising:

a clutch housing located within the differential housing and mounted so as to be rotatable inside the differential housing, the clutch housing includes a portion which is configured to engage with an end of the drive shaft for transmitting rotary motion between the drive shaft and the housing, the clutch housing having a contoured internal surface defining cam surfaces; and a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and a portion of the first pinion shaft, and wherein the other set of rolls is located between a portion of the contoured surface of the clutch housing and a portion of the second pinion shaft;

an electromagnetic control system for indexing the roll cage relative to the clutch housing, the electromagnetic control system include an indexing device for indexing the roll cage, and an electronic control system connected to the indexing device which, when activated, is adapted to cause the indexing device to index the roll cage relative to the clutch housing; and a spring assembly configured to bias the roll cage to a neutral position where the roll cage is not indexed.

2. The front differential of claim 1, wherein the second pinion shaft includes a pinion hub on the second pinion shaft that rotates in combination with the second pinion shaft, the pinion hub being located between the set of rolls and an outer surface of the second pinion shaft.

3. The front differential of claim 2 wherein the shaft of the second pinion extends axially out from an end of the first pinion shaft; and wherein the pinion hub is disposed about the second pinion shaft and axially adjacent to the end of the first pinion shaft.

4. The front differential of claim 1, wherein the differential housing includes a cup-shaped portion with a bearing seat formed about an axial opening, a retention flange extends axially away from the seat, a bearing is mounted on the seat against the flange, and wherein the first and second pinion gears are located on one side of the bearing, and the first and second pinion shafts extend through to an opposite side of the bearing.

5. The front differential of claim 1, wherein the spring assembly includes a torsion spring disposed on a spring retainer, the torsion spring having a generally circular shape with ends that overlap, each end including an arm that extends at a generally right angle to where it attaches to the end of the spring, the arms defining a gap therebetween, the spring retainer including a protrusion or pin that extends out from one side of the retainer and into the gap; and wherein a clutch pin extends outward from the clutch housing and into the gap with the arms on either side of the clutch pin, the retainer pin being located above the clutch pin.

6. The front differential of claim 1, wherein there are two indexing devices, first indexing device configured, when activated, to cause the roll cage to rotate in a first direction relative to the clutch housing, and a second indexing device configured, when activated, to cause the roll cage to rotate in a second direction to the clutch housing that is opposite from the first direction.

7. The front differential of claim 6, wherein at least one of the indexing devices is an electromagnetic coil assembly that includes a coil, and an armature plate, the armature plate being engaged with the roll cage.

8. The front differential of claim 6, wherein the first indexing device includes a drive coil assembly attached to the differential at a location radially outward from the pinion assembly, and a first armature plate disposed about the pinion assembly and adjacent to the drive coil assembly, the armature plate engaged with the roll cage.

9. The front differential of claim 8, wherein the first drive coil assembly is mounted to a removable cover on the differential housing.

10. The front differential of claim 8, wherein the first armature plate includes a plurality of tangs which protrude toward the roll cage, and wherein a spring retainer is engaged with the roll cage, the spring retainer including a plurality of slots, each tang engaging a slot in the spring retainer so that the first armature plate rotates with the roll cage relative to the differential housing.

11. The front differential of claim 10, wherein the second indexing device includes a backdrive coil assembly attached to the differential at a location radially outward from the pinion assembly, and a second armature plate disposed about the pinion assembly and adjacent to the backdrive coil assembly, the armature plate engaged with the roll cage; and a pinion plate positioned between the backdrive coil assembly and the second armature plate, the pinion plate being engaged with the first pinion so as to rotate in combination with the first pinion, wherein the backdrive coil assembly is connected to the electronic control system.

12. The front differential of claim 11, wherein the second armature plate includes a plurality of tangs which protrude toward the roll cage, and wherein each tang engages a slot in the spring retainer so that the second armature plate is adapted to rotate with the roll cage relative to the differential housing.

13. The front differential of claim 12, wherein the indexing systems are configured to move the roll cage in a prescribed direction relative to the clutch housing when either four wheel drive or engine braking is desired.

14. The front differential of claim 6, wherein the first pinion gear and first ring gear have a first gear ratio, wherein the second pinion gear and second ring gear have a second gear ratio, and wherein the first gear ratio is substantially the same as the second gear ratio.

15. The front differential of claim 14, wherein the first gear ratio and the second gear ratio are within about 2% of each other.

16. A front differential for a four wheel drive vehicle, the front differential comprising:
a differential housing;
a pinion assembly including a first pinion with a pinion shaft and a pinion gear on an end, and a second pinion with a pinion shaft and a pinion gear on an end, the second pinion being mounted concentrically within the first pinion and is configured to be rotatable independent from the first pinion, a portion of the shaft of the second pinion extending axially out from an end of the first pinion shaft, a pinion hub disposed about and mounted to the portion of the second pinion shaft adjacent to the end of the first pinion shaft, the pinion hub adapted to rotate in combination with the second pinion shaft;
a ring gear assembly engaged with the pinion assembly for transferring rotary motion between a drive shaft and two driven shafts, the ring gear assembly including a first ring gear with gear teeth, a hub and a stub shaft, and a second ring gear with gear teeth, a hub and recess, the stub shaft of the first ring gear being disposed within the recess of the second ring gear so as to arrange the first and second ring gears concentric with each other and adapted to rotate about the same axis, each hub including a set of splines which are configured to engage with mating splines on one of the driven shafts for transmitting rotation between that hub and the associated driven shaft, the first and second ring gears being mounted so as to be independently rotatable within the differential housing;
the first pinion gear engaged with the first ring gear teeth so that rotation of the first pinion produces corresponding rotation of the first ring gear, the second pinion gear engaged with the second ring gear teeth so that rotation of the second pinion produces corresponding rotation of the second ring gear, the first pinion and first ring gear combination, mounted so as to be rotatable independent from the second pinion and second ring gear combination, thus permitting one to rotate relative to the other, the first pinion and first ring gear combination adapted to rotate one of the driven shafts, and the second pinion and second ring gear combination adapted to rotate the other one of the driven shafts;

a bi-directional overrunning clutch assembly located within the housing and disposed about portions of the first and second pinion shafts, the bi-directional overrunning clutch comprising:

a clutch housing located within the differential housing and mounted so as to be rotatable inside the differential housing, the clutch housing includes a portion which is configured to engage with an end of the drive shaft for transmitting rotary motion between the drive shaft and the housing, the clutch housing having a contoured internal surface defining cam surfaces; and a roll cage assembly located within the clutch housing and including a roll cage with two sets of rolls, each roll disposed within a slot formed in the roll cage, the rolls spaced around the circumference of the cage, and a plurality of springs for positioning the rolls in the slots, wherein one set of rolls is located between a portion of the contoured surface of the clutch housing and a portion of the first pinion shaft, and wherein the other set of rolls is located between a portion of the contoured surface of the clutch housing and a portion of the pinion hub;

an electromagnetic control system for indexing the roll cage relative to the clutch housing, the electromagnetic control system include an indexing device for indexing the roll cage, and an electronic control system connected to the indexing device which, when activated, is adapted to cause the indexing device to index the roll cage relative to the clutch housing; and a spring assembly configured to bias the roll cage to a neutral position where the roll cage is not indexed.

17. The front differential of claim 16, wherein the differential housing includes a cup-shaped portion with a bearing seat formed about an axial opening, a retention flange extends axially away from the seat, a bearing is mounted on the seat against the flange, and wherein the first and second pinion gears are located on one side of the bearing, and the first and second pinion shafts extend through to an opposite side of the bearing.

18. The front differential of claim 16, wherein the spring assembly includes a torsion spring disposed on a spring retainer, the torsion spring having a generally circular shape with ends that overlap, each end including an arm that extends at a generally right angle to where it attaches to the end of the spring, the arms defining a gap therebetween, the spring retainer including a protrusion or pin that extends out from one side of the retainer and into the gap; and wherein a clutch pin extends outward from the clutch housing and into the gap with the arms on either side of the clutch pin, the retainer pin being located above the clutch pin.

19. The front differential of claim 18, wherein there are two indexing devices, first indexing device configured, when activated, to cause the roll cage to rotate in a first direction relative to the clutch housing, and a second indexing device configured, when activated, to cause the roll cage to rotate in a second direction to the clutch housing that is opposite from the first direction.

20. The front differential of claim 19, wherein the first indexing device includes an electromagnetic drive coil assembly attached to the differential at a location radially outward from the pinion assembly, and a first armature plate disposed about the pinion assembly and adjacent to the drive coil assembly, the first armature plate engaged with the roll cage, wherein the first drive coil assembly is mounted to a removable cover on the differential housing.

21. The front differential of claim 20, wherein the first armature plate includes a plurality of tangs which protrude toward the roll cage, and wherein a spring retainer is engaged with the roll cage, the spring retainer including a plurality of slots, each tang engaging a slot in the spring retainer so that the first armature plate rotates with the roll cage relative to the differential housing.

22. The front differential of claim 19, wherein the second indexing device includes a backdrive coil assembly attached to the differential at a location radially outward from the pinion assembly, and a second armature plate disposed about the pinion assembly and adjacent to the backdrive coil assembly, the armature plate engaged with the roll cage; and a pinion plate positioned between the backdrive coil assembly and the second armature plate, the pinion plate being engaged with the first pinion so as to rotate in combination with the first pinion, wherein the backdrive coil assembly is connected to the electronic control system.

23. The front differential of claim 22, wherein the second armature plate includes a plurality of tangs which protrude toward the roll cage, and wherein each tang engages a slot in the spring retainer so that the second armature plate is adapted to rotate with the roll cage relative to the differential housing.

24. The front differential of claim 19, wherein the indexing systems are configured to move the roll cage in a prescribed direction relative to the clutch housing when either four wheel drive or engine braking is desired.

25. The front differential of claim 19, wherein the pinion plate, spring retainer, and first ring gear each include oil holes so as to permit passage of oil from one side of each of the components to another.

26. The front differential of claim 19, wherein the first pinion gear and first ring gear have a first gear ratio, wherein the second pinion gear and second ring gear have a second gear ratio, and wherein the first gear ratio is substantially the same as the second gear ratio.

27. The front differential of claim 26, wherein the first gear ratio and the second gear ratio are within about 2% of each other.

* * * * *